US 8,447,113 B2

United States Patent
Hara et al.

(10) Patent No.: US 8,447,113 B2
(45) Date of Patent: May 21, 2013

(54) CHARACTER AREA EXTRACTING DEVICE, IMAGING DEVICE HAVING CHARACTER AREA EXTRACTING FUNCTION, RECORDING MEDIUM SAVING CHARACTER AREA EXTRACTING PROGRAMS, AND CHARACTER AREA EXTRACTING METHOD

(75) Inventors: Nobuyuki Hara, Kawasaki (JP); Yusaku Fujii, Kawasaki (JP); Hiroaki Takebe, Kawasaki (JP); Katsuhito Fujimoto, Kawasaki (JP); Yoshinobu Hotta, Kawasaki (JP); Akihiro Minagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 246 days.

(21) Appl. No.: 13/067,133

(22) Filed: May 11, 2011

(65) Prior Publication Data
US 2011/0255785 A1  Oct. 20, 2011

Related U.S. Application Data

(63) Continuation of application No. PCT/JP2008/070602, filed on Nov. 12, 2008.

(51) Int. Cl.
*G06K 9/18* (2006.01)
(52) U.S. Cl.
USPC ........................................................ 382/182
(58) Field of Classification Search
None
See application file for complete search history.

(56) References Cited

U.S. PATENT DOCUMENTS

| 8,064,095 B2 * | 11/2011 | Maki ............................... 358/1.2 |
| 2002/0085116 A1 * | 7/2002 | Kuwano et al. ................ 348/465 |
| 2008/0231876 A1 * | 9/2008 | Harada ........................... 358/1.9 |

FOREIGN PATENT DOCUMENTS

| JP | 3913985 | 5/2007 |
| JP | 2008-079258 | 4/2008 |
| JP | 2008-113446 | 5/2008 |

OTHER PUBLICATIONS

International Search Report for PCT/JP2008/070602, Mailed Dec. 16, 2008.

* cited by examiner

*Primary Examiner* — Samir Ahmed
(74) *Attorney, Agent, or Firm* — Staas & Halsey LLP

(57) ABSTRACT

A character area extracting device includes a reflective and non-reflective area separation unit separating image data into reflective and non-reflective areas, and binarizing the image data by changing a first threshold value when it is inappropriate; a reflective area binarizing unit separating the reflective area into character and background areas, and binarizing it by changing a second threshold value when it is inappropriate; a non-reflective area binarizing unit separating the non-reflective area into the character and background areas, and binarizing it by changing a third threshold value when it is inappropriate; a reflective and non-reflective area separation evaluation unit; and a line extracting unit connecting the character areas of the reflective and non-reflective areas and extracting positional information of the connected character areas in the image data.

20 Claims, 10 Drawing Sheets

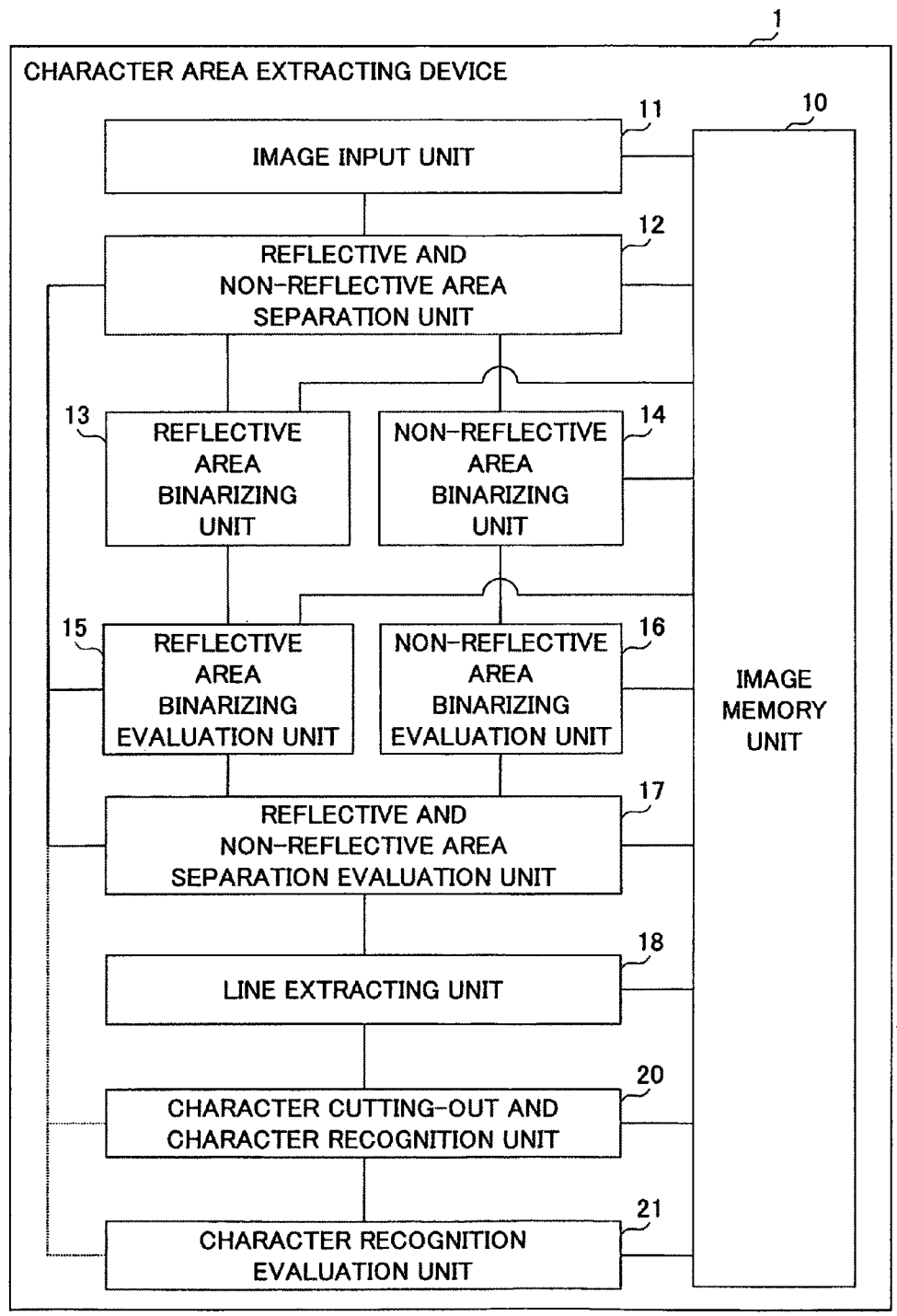

NON-REFLECTIVE AREA
(GRAY PIXEL AREA)

REFLECTIVE AREA
(WHITE PIXEL AREA)

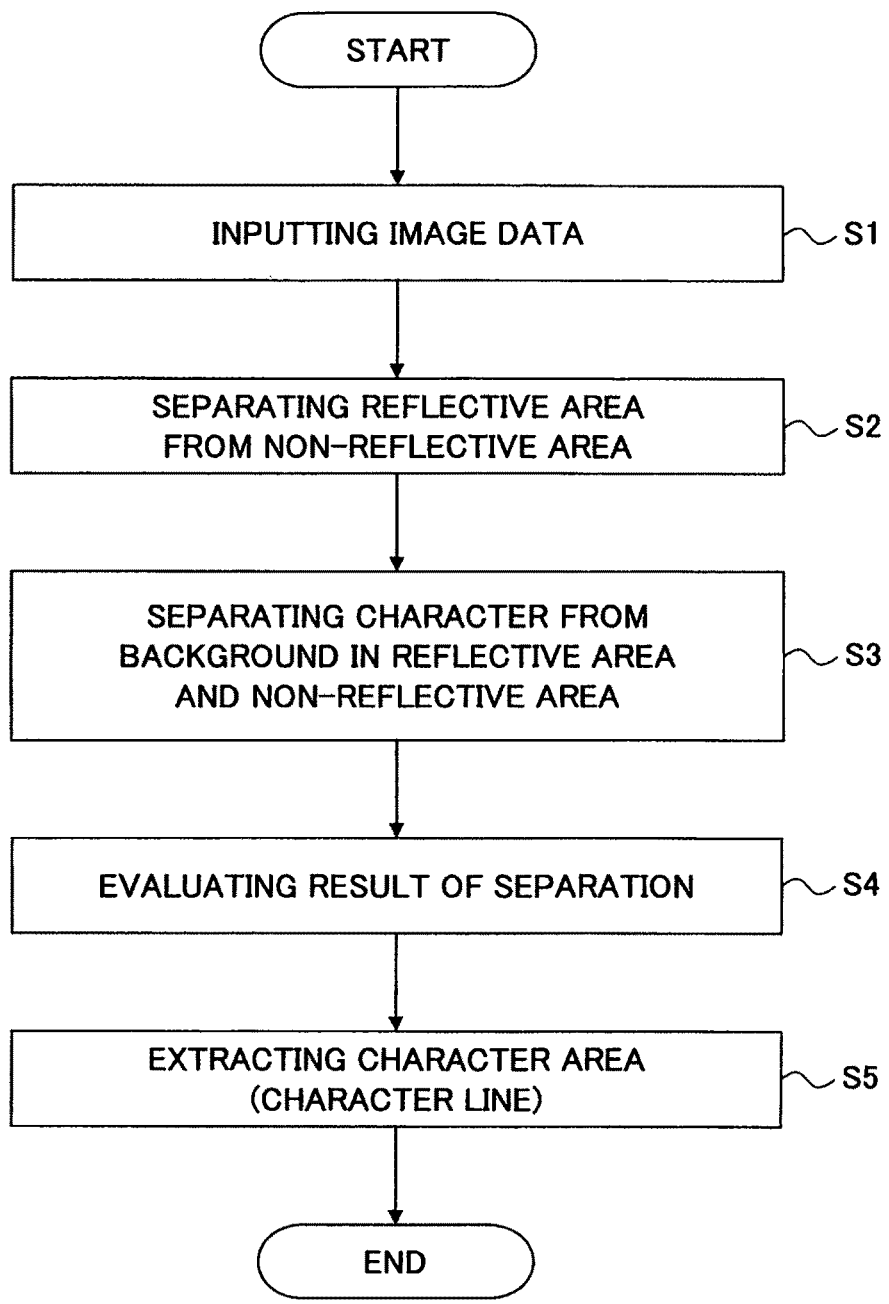

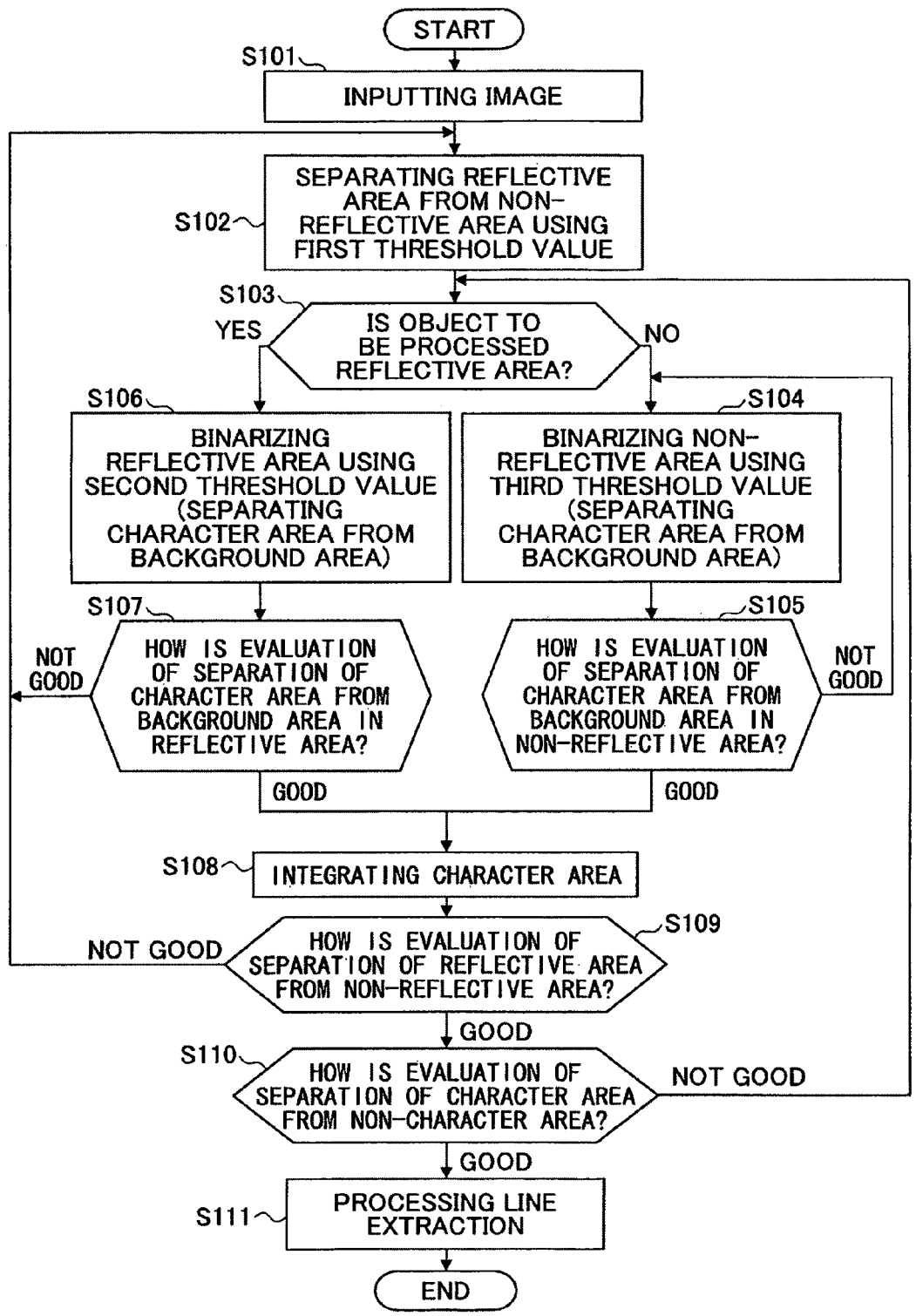

FIG.6A
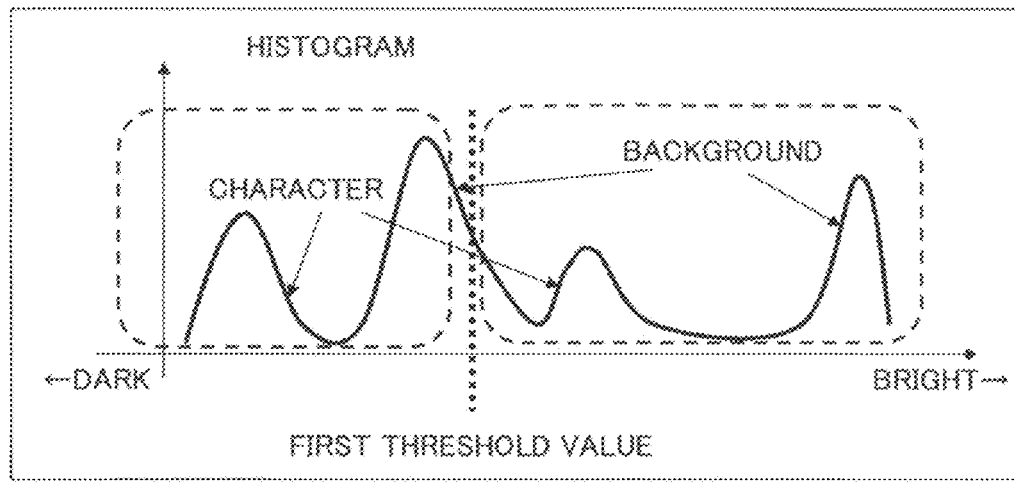
FIG.6B
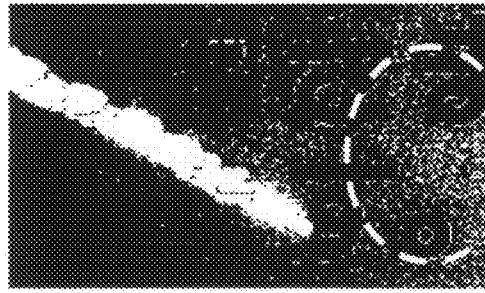

THRESHOLD VALUE IN EXTRACTING CHARACTER AREA

CHARACTER AREA EXTRACTING DEVICE, IMAGING DEVICE HAVING CHARACTER AREA EXTRACTING FUNCTION, RECORDING MEDIUM SAVING CHARACTER AREA EXTRACTING PROGRAMS, AND CHARACTER AREA EXTRACTING METHOD

CROSS-REFERENCE TO RELATED APPLICATIONS

This application is a U.S. continuation application filed under 35 USC 111a and 365c of PCT application JP2008/070602, filed Nov. 12, 2008. The foregoing application are hereby incorporated herein by reference.

FIELD

A certain aspect of the embodiments discussed herein is related to an extraction process of a character area from image data. Specifically, the certain aspect of the embodiments discussed herein is related to a technique in which binary data to be recognized as characters are obtained from image data of an object to be imaged (a photographic subject), and a character area can be accurately extracted from image data causing reflection of an impinged environment light. A character area is a pixel area classified to have character pixels.

BACKGROUND

Japanese Laid-open Patent Publication No. 2008-113446 discloses maintenance of a gradation of a middle-tone area in an original image inputted from various image input apparatuses and also automatic adjustment of a contrast between a black character and a ground in an output image without a user performing an operation, such as setting a parameter.

Japanese Laid-open Patent Publication No. 2008-79258 discloses a sharp reproduction of characters on a whiteboard or blackboard where illumination is reflected. For this, a luminance distribution histogram of image data is created to specify a background portion and a reflection portion of a whiteboard. A portion without characters and a portion with characters are then specified only for the reflection portion and characters contained in the reflection portion are reproduced to be sharp. The characters are reproduced while specifying the reflection portion, so that even in a portion which is saturated and in which a color difference is hardly presented, in the reflection portion, the portion without characters and the portion with characters can be surely discriminated without being affected by colors in other image portions.

SUMMARY

According to an aspect of the embodiment, an character area extracting device includes an image input unit configured to receive image data obtained by photographing a photographic subject; an image memory unit configured to store the received image data; a reflective and non-reflective area separation unit configured to binarize the image data with a first threshold value, separate the image data into a reflective area in which a pixel value is saturated and a non-reflective area in which the pixel value is not saturated, and binarize the image data by changing the first threshold value when it is determined that the first threshold value is evaluated not to be appropriate; a reflective area binarizing unit configured to binarize the reflective area of the image data with a second threshold value, separate the reflective area into a character area and a background area, and binarize the reflective area by changing the second threshold value when it is determined that the second threshold value is evaluated not to be appropriate; a non-reflective area binarizing unit configured to binarize the non-reflective area of the image data with a third threshold value, separate the non-reflective area into the character area and the background area, and binarize the non-reflective area by changing the third threshold value when it is determined that the third threshold value is evaluated not to be appropriate; a reflective and non-reflective area separation evaluation unit configured to evaluate the first, second and third threshold values using results of the separations with the reflective area binarizing unit and the non-reflective area binarizing unit; and a line extracting unit configured to connect the character area of the reflective area and the character area of the non-reflective area and extract positional information of the connected character area in the image data.

The object and advantages of the invention will be realized and attained by means of the elements and combinations particularly pointed out in the appended claims.

It is to be understood that both the foregoing general description and the following detailed description are exemplary and explanatory and are not restrictive of the invention as claimed.

BRIEF DESCRIPTION OF THE DRAWINGS

FIG. 1 illustrates a structural example of a functional block of a character area extracting device of Embodiment 1;

FIG. 3 illustrates a process carried out by the character area extracting device of Embodiment 1;

FIG. 4 is a flowchart of a character area extracting process of Embodiment 1;

FIG. 6A and FIG. 6B illustrate examples of a result of a separation of image data when a first threshold value is not appropriate;

DESCRIPTION OF EMBODIMENT

Figure 2A:
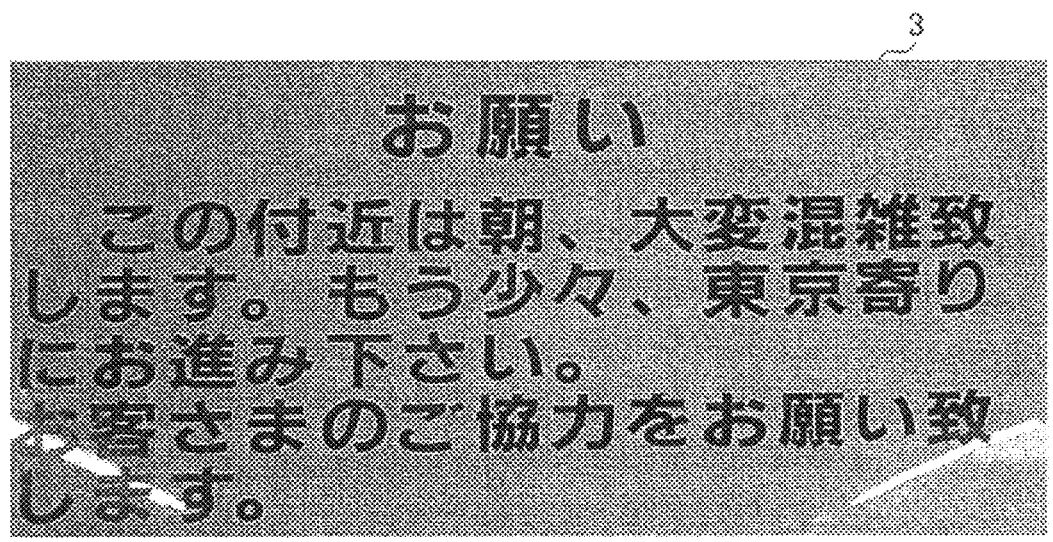
FIG. 2A and FIG. 2B illustrates examples of image data processed by the character area extracting device.

In a compact digital camera, a portable phone having a camera function or the like, a highly accurate character recognizing function may be demanded in addition to a photograph function.

When image data to be recognized as characters are taken by a desktop device such as a scanner, disturbance can be ignored. However, because a compact digital camera, a portable phone or the like may be used in either an indoor place or an outdoor place, consideration of disturbance in taking images is important. Especially, one of big phenomena is generation of reflection of illuminating light on a material such as glass or plastic having a high reflectance ratio positioned on a surface of a photographic subject. This reflection of the illuminating light causes visibility or character recognition accuracy to be decreased.

The reason for the phenomenon is a decrement of contrast between a background and characters in a reflective area and degradation of accuracy in separating the background and the characters caused by a difference between the above decreased contrast and a contrast between a background and characters in a non-reflective area. This phenomenon may be caused when the background and characters are uniform without having an intricate pattern.

Here, it is possible to improve image quality or character recognition accuracy with visual contact by complementing background colors and character colors on the reflective area of the photographed image.

When the character area and the background area are separated based on local edge strength and the photographed image is complemented using a background color estimated from pixels belonging to the character and background areas based on contrasting density, the characters and the background may be separated.

When the background color is estimated using a density histogram of an input image, the characters and the background color are separated, an area having a density value higher than that of the background color in the reflective area is estimated using the density histogram, and the characters and the background are separated based on the result of the estimation, a character area of an entire image including the reflective area may be obtained.

However, in an image having the reflective area, an edge may occur not only in a boundary between the characters and the background but also in a boundary between the reflective area and the non-reflective area. In this case, the edge between the reflective area and the non-reflective area generated on the background area may be detected in error as a part of the character area to thereby degrade accuracy in extracting the character area and further degrade a recognition accuracy in the character recognition process.

When the density values of the pixels belonging to the character area and the background area are not uniform respectively in the character area and the background area, it is difficult to detect an appropriate threshold value in separating areas on the histogram. When evaluation of the threshold value and compensation based on the evaluation are not carried out, accuracy of separating the character area from the background area may be degraded to thereby degrade the accuracy of the character area extraction and recognition accuracy of the character recognition process.

Preferred embodiments of the present invention will be explained with reference to accompanying drawings.

FIG. 1 illustrates a structural example of a functional block diagram of a character area extracting device of Embodiment 1.

The character area extracting device 1 includes an image memory unit 10, an image input unit 11, a reflective and non-reflective area separation unit 12, a reflective area binarizing unit 13, a non-reflective area binarizing unit 14, a reflective area binarizing evaluation unit 15, a non-reflective area binarizing evaluation unit 16, a reflective and non-reflective area separation evaluation unit 17 and a line extracting unit 18.

Hereinafter, one or a plurality of character areas arranged on the same base line are referred to as "line".

With this Embodiment, the character area extracting device 1 further includes a character cutting-out and character recognition unit 20 for realizing a character recognizing function and a character recognition evaluation unit 21.

The image memory unit 10 stores image data 3 obtained by photographing (capturing) a photographic subject.

The image input unit 11 receives the image data 3 obtained by photographing the photographic subject and stores the image data 3 in the image memory unit 10.

FIG. 2A illustrates an example of the image data 3.

In the image data 3 of FIG. 2A, fluorescent lighting impinges on the image data 3 so as to cross over a character area in a substantially lateral direction. The impinging light is reflected on the image data. In the non-reflective area where the reflection is not caused, there is a sufficient contrast between the background and the characters. However, in the reflective area, the contrast between the background and the characters is degraded.

Figure 2B:
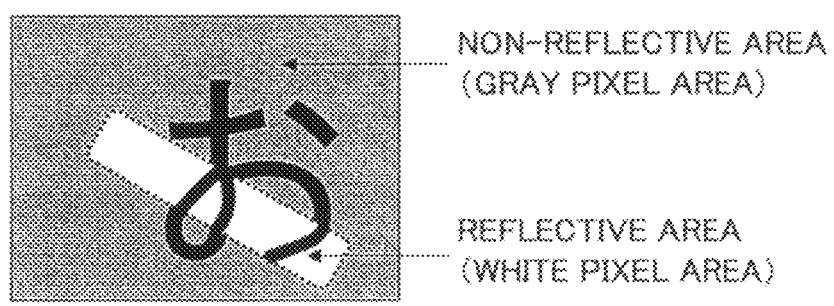

FIG. 2B is a schematic view obtained by enlarging the character "お" of the image data.

Referring to FIG. 2B, there is the reflection in the character "お" of the image data 3. The reflective area is surrounded by a dot-line in FIG. 2B. The character area is a black pixel area and the background area is a gray pixel area.

With this reflective area, accuracy of separating the background area from the character area is lowered.

The reflective and non-reflective area separation unit 12 binarizes the image data 3 with a first threshold value to separate the image data 3 into the reflective area where pixel values are saturated and the non-reflective area where the pixel values are not saturated. The reflective and non-reflective area separation unit 12 changes the first threshold value when the first threshold value is not evaluated to be appropriate and carries out a binarizing process of the image data 3.

The reflective area binarizing unit 13 binarizes the reflective area of the image data 3 with a second threshold value and separates the reflective area into the character area having pixels darker than the second threshold value and the background area other than the character area. The reflective area binarizing unit 13 carries out the binarizing process of the reflective area of the image data 3 by changing the second threshold when the second threshold value is evaluated to be unsuitable.

The non-reflective area binarizing unit 14 binarizes the non-reflective area of the image data 3 with a third threshold value and separates the non-reflective area into the character area having pixels darker than the third threshold value and the background area other than the character area. The non-reflective area binarizing unit 14 carries out the binarizing process of the non-reflective area of the image data 3 by changing the third threshold when the third threshold value is not evaluated to be suitable.

The reflective area binarizing evaluation unit 15 acquires an outline length (outline pixel length) of a contact portion between an outline of the reflective area of the image data 3 and an outline of the background area classified as a low density value area and determines a relationship between the outline pixel length and a predetermined evaluation value to thereby evaluate the first threshold value.

Concerning the contact portion between the outline of the reflective area of the image data 3 separated by the reflective and non-reflective area separation unit 12 and the outline of the background area of the reflective area separated by the reflective area binarizing unit 13, when the density value used as the first threshold value of the binarizing process for the reflective and non-reflective areas is smaller than an appropriate value and not suitable, the dimensions of the background area of the reflective area increases and the contact portion between the reflective area and the background area increases.

With the Embodiment, the reflective area binarizing evaluation unit 15 calculates a pixel number of the contact portion between the outline of the reflective area and the outline of the background area of the reflective area, determines whether the calculated pixel number is a predetermined evaluation value (the evaluation value of the first threshold value) or less, and evaluates whether the first threshold value used for the binarizing process is appropriate. When the calculated pixel number is the first threshold value or less, the first threshold value is evaluated as being appropriate; and when the calculated pixel value is more than the first threshold value, the first threshold value is evaluated as not being appropriate.

The reflective area binarizing evaluation unit 15 evaluates whether the second threshold value is appropriate using the result of separation between the character area in the reflective area and the background area.

The non-reflective area binarizing evaluation unit 16 evaluates whether the third threshold value is appropriate using the result of separation between the character area in the non-reflective area and the background area.

With the Embodiment, the reflective area binarizing evaluation unit 15 acquires the dimensions (the pixel number of the character area) and the outline width (the outline pixel number of the character area) of the character area separated by the reflective area of the image data 3 and determines a relationship between a ratio of the outline pixel number relative to the pixel number of the character area to thereby evaluate the second threshold value.

With the Embodiment, the non-reflective area binarizing evaluation unit 16 acquires the dimensions (the pixel number of the character area) and the outline width (the outline pixel number of the character area) of the character area separated by the non-reflective area of the image data 3 and determines a relationship between a ratio of the outline pixel number relative to the pixel number of the character area to thereby evaluate the third threshold value.

When the third threshold value is not appropriate in the binarizing process with the non-reflective area binarizing unit, noise may be generated in the image separated as the character area in the result of the separation. The noise may be generated more in the result of the separation using the inappropriate threshold value than the result of the separation using the appropriate threshold value.

With the Embodiment, the ratio between the dimensions of the character area and the outline width is focused on. The non-reflective area binarizing evaluation unit 16 calculates the ratio of the outline pixel number (the outline width) relative to the outline width, determines whether the acquired ratio is the predetermined evaluation value (the evaluation value for the third threshold value) or less, and evaluates that the third threshold value used in the binarizing process is appropriate when the calculated ratio is the evaluation value for the third threshold value or less or that the third threshold value used in the binarizing process is inappropriate when the calculated ratio exceeds the evaluation value for the third threshold value.

The reflective area binarizing evaluation unit 15 carries out a similar process to that in the non-reflective area binarizing evaluation unit 16 to thereby evaluate the second threshold value.

The reflective and non-reflective area separation evaluation unit 17 evaluates whether the first to third threshold values are appropriate using the result of the separation in the reflective area and the result of the separation in the non-reflective area.

The reflective and non-reflective area separation evaluation unit 17 connects the character area separated by the non-reflective area of the image data 3 and the character area separated by the reflective area, acquires an outline pixel number in the connecting portion between the reflective area and the non-reflective area of the connected character areas, and determines a relationship between a difference of the outline pixel number in the connecting portion and a predetermined evaluation condition to thereby evaluate whether the first through third threshold values are appropriate values. It is desired that the width of the character area crossing over the boundary between the reflective area and the non-reflective area does not greatly change between the sides of the boundary (the reflective area side and the non-reflective area side), and the outline widths of the contact portions between the character areas are substantially the same with respect to the result of the integration of the two character area images obtained by binarizing the reflective and non-reflective areas of the image data 3.

However, when the first threshold value in separating into the reflective area and the non-reflective area is not the appropriate value, the character areas cannot be connected. Further, when the second threshold value, the third threshold value or the second and third threshold values are not the appropriate values, the difference of the outline widths becomes large.

In this Embodiment, the reflective and non-reflective area separation evaluation unit 17 calculates a difference between the outline width (the outline pixel number) of the connected character areas on the reflective side and the outline width (the outline pixel number) of the connected character areas on the non-reflective side, determines whether the obtained difference is within a range of a predetermined evaluation value (a first separation evaluating range), and evaluates the first threshold value to be appropriate when the acquired difference is within the first separation evaluating range or to be inappropriate when the acquired difference is out of the first separation evaluating range.

When the reflective and non-reflective area separation evaluation unit 17 determines that the obtained difference is within the first separation evaluating range, the reflective and non-reflective area separation evaluation unit 17 further determines whether the obtained difference is within a second separation evaluating range, evaluates the second and third threshold values to be appropriate when the acquired difference is within the second separation evaluating range or to be inappropriate when the acquired difference is out of the second separation evaluating range.

The line extracting unit 18 connects the character area separated within the reflective area of the image data 3 and the character area separated within the non-reflective area of the image data 3, and extracts positional information of the character area in the image data 3.

Further, the reflective and non-reflective area separation unit 12, the reflective area binarizing unit 13 and the non-reflective area binarizing unit 14 change the threshold values (the first to third threshold values) in the binarizing process based on combinations of the plural evaluations when the plural evaluations are performed on the result of the separation with the binarizing process, and perform the binarizing process using the changed threshold values.

With this, the binarizing process can be performed by reflecting the evaluation of the binarizing process to thereby obtain the result of separating reflection/non-reflection and character/background.

Further, the reflective and non-reflective area separation unit 12, the reflective area binarizing unit 13 and the non-reflective area binarizing unit 14 have density values of two or more as the thresholds (first to third threshold values) used for the own process, hold the result of the separation obtained by the binarizing process using the plural density values, and select the result of separating using the most appropriate density value when there is the evaluation for the result of separating using the plural density values.

The reflective and non-reflective area separation unit 12, the reflective area binarizing unit 13 and the non-reflective area binarizing unit 14 can acquire plural results of the separations and perform the evaluation process of the results of the separation by previously performing the binary process using the plural threshold values and holding the results of the separation. Therefore, it is possible to efficiently acquire the result of the separation with the appropriate threshold value in comparison with the case where the result of the separation using only one threshold value is evaluated and the binarizing process is performed again using the threshold value changed by the result of the evaluation. Thus, the overall processing efficiency can be improved.

The character cutting-out and character recognition unit 20 cuts a character out of the character area of the image data 3 based on the positional information of the character area specified by the line extracting unit 18 and performs the character recognizing process of the cut character.

The character recognition evaluation unit 21 evaluates the accuracy of the character recognition in the character cutting-out and character recognition unit 20.

The character recognition evaluation unit 21 calculates a recognition ratio of the character recognition in the reflective area and the non-reflective area, determines that the second threshold value is not appropriate when the recognition ratio in the reflective area is lower than a predetermined evaluation value, and evaluates that the third threshold value is not appropriate when the recognition ratio in the non-reflective area is lower than a predetermined evaluation value. When the recognition ratios on both of the non-reflective area and the reflective area are low, it is evaluated that the first threshold value is not appropriate.

By evaluating the recognition accuracy of the character recognition, the reflective and non-reflective area separation unit 12, the reflective area binarizing unit 13 and the non-reflective area binarizing unit 14 can change the threshold values of the binarizing process. By performing the binarizing process using the changed threshold values, it is possible to specify the character area with higher accuracy to thereby improve the accuracy of the character recognition.

The character area extracting device 1 can accurately acquire a result of extracting the character area (line) by recursively performing the separation of the image data in two stages, including the separation into the reflective and non-reflective areas and the separation into the character and background areas, and performing the evaluating process for the results of the separations with the above-described structure.

FIG. 3 illustrates processes performed by the character area extracting device 1 of the Embodiment.

In step S1, the image input unit 11 receives the image data 3 obtained by photographing a photographic subject and stores the image data 3 in the image memory unit 10. In step S2, the reflective and non-reflective area separation unit 12 binarizes the image data 3 in the image memory unit 10 using the first threshold value, and separates the image data 3 into the reflective and non-reflective areas.

In step S3, the reflective area binarizing unit 13 binarizes the reflective area of the image data 3 using the second threshold value, the non-reflective area binarizing unit 14 binarizes the non-reflective area of the image data 3 using the third threshold value, and the reflective area and the non-reflective area are respectively separated into the character areas and background areas.

In step S4, the reflective area binarizing evaluation unit 15, the non-reflective area binarizing evaluation unit 16 and the reflective and non-reflective area separation evaluation unit 17 evaluate whether the first, second and third threshold values are appropriate by determining whether the results of the separations performed by the reflective area binarizing unit 13 and the non-reflective area binarizing unit 14 satisfy predetermined evaluation conditions.

In step S5, the line extracting unit 18 connects the character area separated within the reflective area to the character area separated within the non-reflective area, specifies the positional information in the image data 3, and outputs the positional information.

After the step S5, the character cutting-out and character recognition unit 20 cuts the character based on the positional information of the character area and performs the character recognition of the cut character.

After the character recognition, the character recognition evaluation unit 21 evaluates the accuracy of the character recognition in the character cutting-out and character recognition unit 20.

The character recognition evaluation unit 21 performs the character recognition process. The character recognition process may be a known process. For example, character lines are confirmed by recognizing after extracting the character lines, a character having certainty of a predetermined threshold or more is determined as a real character component, and a character line having certainty of less than the predetermined threshold is determined not to be the character component; a group of the real character components is extracted, and a recognition ratio of the real character components relative to all the character components is acquired.

Hereinafter, a process with the character area extracting device is described in detail.

FIG. 4 is a flowchart of a character area extracting process.

In Step S101, for example, the image input unit 11 receives the image data 3 illustrated in FIG. 2A and stores the image data 3 into the image memory unit 10.

In step S102, the reflective and non-reflective area separation unit 12 performs the binarizing process of the image data 3 based in the density value set as the first threshold value in order to separate the image data 3 into a reflective area and a non-reflective area. The reflective and non-reflective area separation unit 12 determines the density value to be the first threshold value from the density value of the entire image data 3 as preparation for the binarizing process. As the first threshold value, it is possible to use an average value such as a mode value of the density value, an average value of the density value or the like. However, the first threshold value is not limited thereto. The reflective and non-reflective area separation unit 12 classifies pixels in the entire image data into either the reflective area or the non-reflective area using the first threshold value. After the classification, the dimensions (the pixel numbers) and the outline widths (the outline pixel numbers) of the reflective area and the non-reflective area are acquired.

Next, when an object to be processed is not a reflective area in NO of step S103, the process of step S104 is performed. When the object to be processed is a reflective area in YES of step S103, the process of step S106 is performed.

With the process of step S104, the non-reflective area binarizing unit 14 binarizes the image data of the non-reflective area separated from the image data 3 using the third threshold value. The pixels are classified into the character area and the background area. The third threshold value is a density value different from the first threshold value, and is determined from the density value inside the non-reflective area of the image data 3. The third threshold value may be a local minimal value of a density histogram or a mode value of the density value. However, the third threshold value is not limited thereto.

The non-reflective area binarizing unit 14 acquires the dimensions (the pixel numbers) and the outline width (the outline pixel numbers) of the character areas after classifying the pixels of the non-reflective area of the image data 3.

In step S105, the non-reflective area binarizing evaluation unit 16 determines whether an evaluation condition is satisfied in the result of the separation obtained by the non-reflective area binarizing unit 14 and evaluates whether the third threshold value is appropriate. The evaluation condition is "a ratio of the outline pixel number (the outline width) of the black pixel area to be a candidate of the character area inside the non-reflective area relative to the dimensions (the pixel number) of the black pixel area is a predetermined value or less.

Figure 5A:
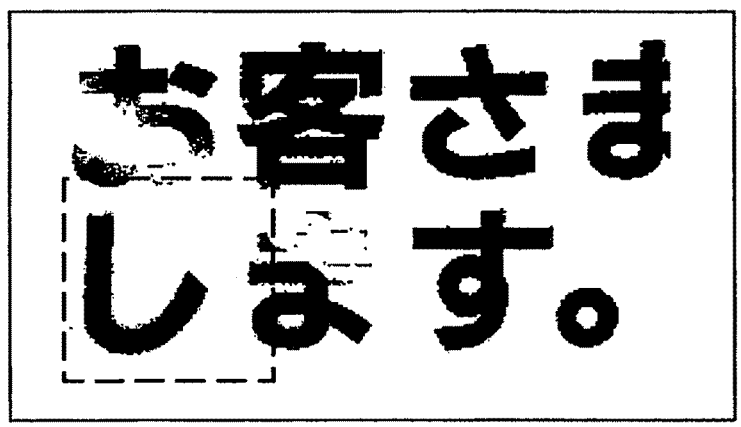
FIG. 5A and FIG. 5B illustrate examples of separated character area and background area in a non-reflective area of image data of Embodiment 1.
Figure 5B:
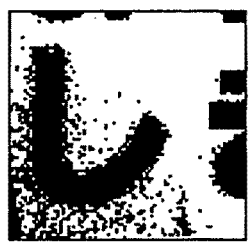

FIG. 5A illustrates an example of a result of separating the non-reflective area of the image data 3 into the character area and the background area. FIG. 5A illustrates a result of separating the image data into the character and the background using an appropriate third threshold value. FIG. 5B illustrates a result of separating the image data into the character and the background using an inappropriate third threshold value.

Referring to FIG. 5B, since the third threshold value is inappropriate, pixels which are ordinarily classified into the background area are classified to be in the character area in error and appear as noise on a character area image inside the non-reflective area.

When the noise is generated, the dimensions (the pixel number) and the outline length (the outline pixel length) of the character area increase. As a characteristic of the noise on the background, many minute character areas are generated. Therefore, an increment ratio of the outline length becomes higher than the increment ratio of the dimensions, and therefore a ratio between the outline length (the outline pixel number) and the dimensions (the pixel number) tends to greatly increase in a threshold value in which the noise starts to be generated.

Depending on the tendency, the non-reflective area binarizing evaluation unit 16 determines whether a ratio of the outline pixel number of the character area inside the non-reflective area relative to the pixel number of the character area is a predetermined evaluation value or less.

When this ratio is the evaluation value or less, said differently the ratio satisfies the evaluation condition, in "GOOD" of step S105, the third threshold value is evaluated as being an appropriate value, and the process goes to step S108.

On the other hand, when the result of the separation does not satisfy the evaluation condition in "NOT GOOD" of step S105, the process goes to step S104. Since the third threshold value is evaluated as being "NOT GOOD", the non-reflective area binarizing unit 14 revises the third threshold value to be a value by which the character area is reduced, and separates the character area from the background area within the non-reflective area using the revised third threshold value.

With this, the appropriate result of separating into the character area and the background area as illustrated in FIG. 5A is obtainable.

With the process of step S106, the reflective area binarizing unit 13 binarizes the image data of the reflective area separated from the image data 3 using the second threshold value. The pixels are classified into the character area and the background area. The second threshold value is a density value different from the first threshold value, and is determined from the density value inside the reflective area of the image data 3. The second threshold value may be a local minimal value of a density histogram or a mode value of the density value. However, the second threshold value is not limited thereto.

In step S107, the reflective area binarizing evaluation unit 15 uses the result of the separation with the reflective area binarizing unit 13 and the result of the separation with the reflective and non-reflective area separation unit 12, and determines whether the length (the outline pixel number) of a portion at which a contact portion between the outline of the reflective area and the background area (a low density value area) inside the reflective area has a predetermined value or less to thereby evaluate whether the first threshold value is appropriate.

FIG. 6A and FIG. 6B illustrate examples of a result of separating image data 3 when a first threshold value is not appropriate.

Portions in which the outlines of parts of a reflective area separated from the image data 3 contact the outlines of parts of a background area (a low density value area) separated inside the reflective area using a second threshold value are focused on. When the first threshold value is lower than an appropriate value, the low density value area in the reflective area of the image data 3 increases. At the same time, the length (the outline pixel number) of the portion in which the outline of the low density value area contacts the outline of the reflective area also increases. By determining whether the outline pixel number of the contact portion between the outlines is a predetermined evaluation number or less, it is possible to evaluate whether the first threshold value is appropriate.

When the outline pixel length is the predetermined evaluation value or less, said differently the evaluation condition is satisfied, in "GOOD" of step S107, the first threshold value is evaluated as being the appropriate value, the process goes to step S108.

On the other hand, when the result of the separation does not satisfies the evaluation condition in "NOT GOOD" of step S107, the process goes back to step S102.

When the first threshold value is evaluated to be "NOT GOOD", the reflective and non-reflective area separation unit 12 revises the first threshold value to have a higher value and separates the image data 3 into the reflective area and the non-reflective area using the revised threshold value.

With this, the result of separating into the reflective area and the non-reflective area to be used as a basis of the process of separating into the character area and the background area is obtainable with higher accuracy.

In step S108, the reflective and non-reflective area separation evaluation unit 17 connects the results of the separations respectively obtained in the reflective and non-reflective areas and generates the character area and the background area of the entire image data 3.

Figure 7A:
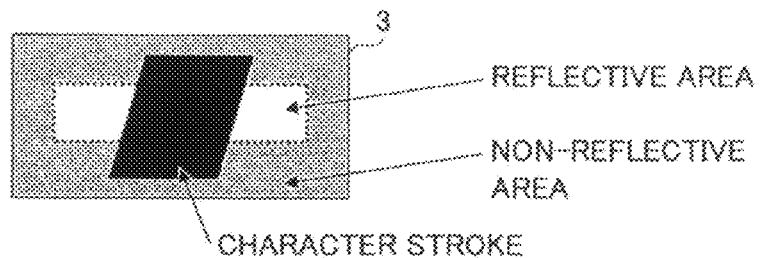
FIG. 7A through FIG. 7F illustrate a flow of a data integration process to a character area generation process of the image data.
Figure 7B:
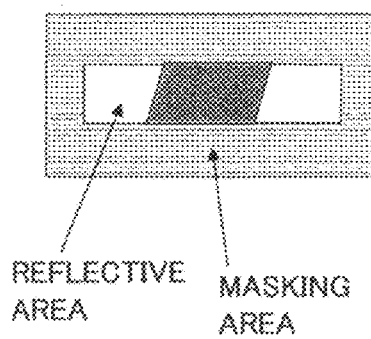
Figure 7C:
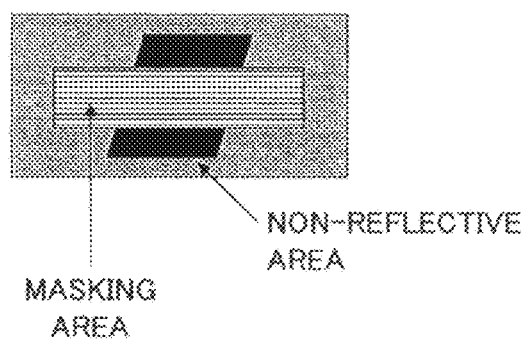
Figure 7D:
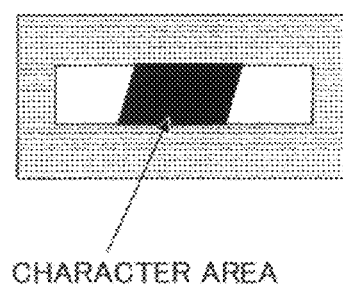
Figure 7E:
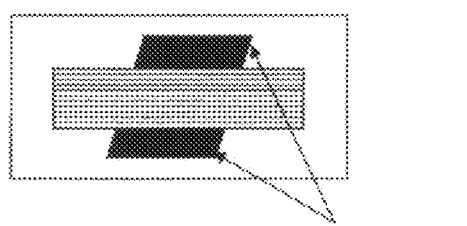
Figure 7F:
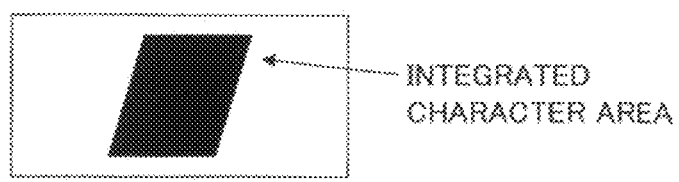

FIG. 7A and FIG. 7F illustrate processes of connecting the reflective area to the non-reflective area and generating the character area and the background area. Referring to FIG. 7A, there is a black character stroke on gray background pixels in image data 3 and the reflection area is generated so as to cross into the character stroke.

The image data 3 illustrated in FIG. 7A is separated by the reflective and non-reflective area separation unit 12 into the reflective area (a central portion) of the image data 3 illustrated in FIG. 7B and the non-reflective area (a peripheral portion) illustrated in FIG. 7C. Referring to FIG. 7B and FIG. 7C, regions hatched by traverse lines indicate masking areas.

The reflective area binarizing unit 13 and the non-reflective area binarizing unit 14 separate the image data 3 into the character areas and the background areas as illustrated in FIG. 7D and FIG. 7E. The background area of the reflective area is indicated by white and the character area of the reflective area is indicated by black.

Referring to FIG. 7F, the reflective and non-reflective area separation evaluation unit 17 connects the character areas of the reflective and non-reflective areas to acquire the entire character area of the image data 3. Referring to FIG. 7F, the same character area as that of the character stroke (the black pixels) illustrated in FIG. 7A is detected on the image data 3.

In steps S109 and S110, the reflective and non-reflective area separation evaluation unit 17 evaluates the first through third threshold values using the result of connecting the character areas separated by the reflective area and the non-reflective area.

In the evaluation process, differences of the outline pixel numbers of the parts of the character areas in the connecting portions between the parts of the character area inside the reflective area and the parts of the character area inside the non-reflective area are used for the result of connecting the character area inside the reflective area to the character area inside the non-reflective area. With the Embodiment, the pixel number of the connecting portion between the character area and the reflective area and the pixel number of the connecting portion between the character area and the non-reflective area are acquired. When the difference between the pixel numbers exceeds the predetermined threshold value, it is evaluated that the first threshold is not the appropriate value.

Further, when the difference between the outline pixel numbers of the connecting portions is larger than the predetermined evaluation value, the second and third threshold values are evaluated as not being appropriate.

Figure 8A:
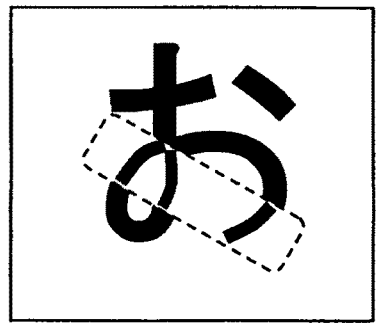
FIG. 8A through FIG. 8C illustrate an example of connecting parts of a character area separated in a reflective area to parts of a character area separated in a non-reflective area.
Figure 8B:
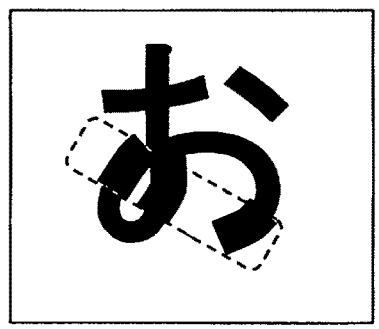
Figure 8C:
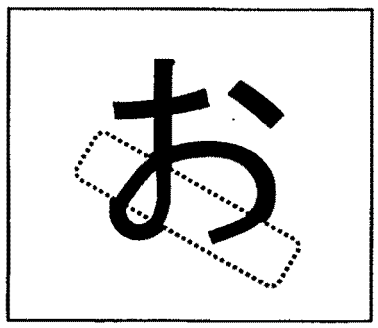

FIG. 8A through FIG. 8C illustrate an example of connecting parts of a character area separated in a reflective area to parts of a character area separated in a non-reflective area.

Referring to FIG. 8A, when the first threshold value is substantially larger than the appropriate value in the connected character areas, a part of the character pixels inside the reflective area may be erroneously classified to be in the background inside the non-reflective area to thereby break the character stroke in a border between the reflective area and the non-reflective area.

Referring to FIG. 8B, when the first threshold value is substantially smaller than the appropriate value in the connected character areas, a part of the background pixels inside the non-reflective area may be erroneously classified into the character inside the background area to thereby cause the character to have noise in a border between the reflective area and the non-reflective area.

Referring to FIG. 8C, when the first threshold value is a little larger or smaller than the appropriate value, there may occur a difference of the width in the character stroke of the connected character areas.

Referring to FIG. 8A and FIG. 8B, when the difference of the pixels in the reflective area and the non-reflective area in the connecting portion of the character areas are substantially large and exceeds a range of the predetermined evaluation value (a first separation evaluating range), the reflective and non-reflective area separation evaluation unit 17 evaluates that the first threshold is not the appropriate value in "NOT GOOD" of step S109 and performs the process of step S102.

In the process of step S102, the first threshold value is revised and the process of separating into the reflective area and the non-reflective area is performed again.

Referring to FIG. 8C, when the difference between the outline pixel numbers of the two character areas exceeds a predetermined range of the evaluation value (a second separation evaluating range), the second and third threshold values are evaluated as not being appropriate in "NOT GOOD" of step S110, and the process returns back to step S103.

In the process of step S103, an object to be processed is determined. As for the reflective area, the second threshold value is revised so that the process of separating into the character area and the background area is carried out again in step S106. As for the non-reflective area, the third threshold value is revised so that the process of separating into the character area and the background area is carried out again in step S104.

When it is evaluated that all the first, second and third threshold values are appropriate in "GOOD" of step S109 and "GOOD" of step S110, the line extracting unit 18 specifies the positional information of the connected character areas in the image data 3 and outputs the positional information in step S111.

Figure 9A:
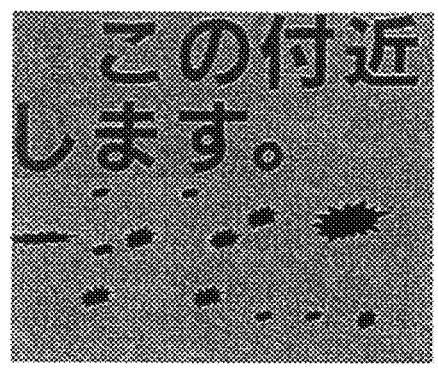
FIG. 9A and FIG. 9B illustrate a process of obtaining rectangular circumscribing edges in a line extracting process; and FIG. 10A
Figure 9B:
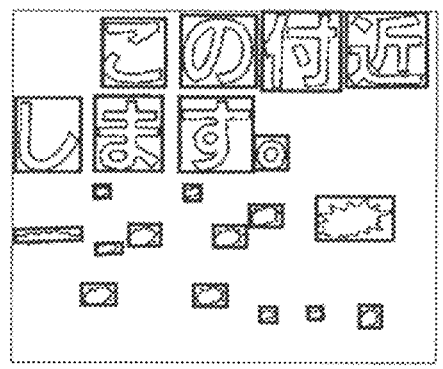
Figure 10A:
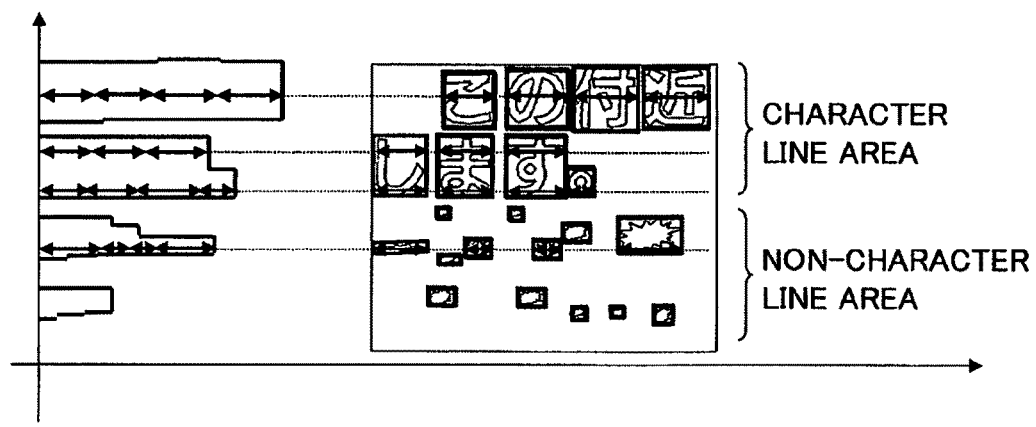
FIG. 10B illustrates a threshold value for extracting character areas obtained by using a distribution curve of a width of an circumscribing rectangular in a line extracting process.

The line extracting unit 18 performs the line extracting process and outputs the position of the extracted position of the character line as the result of extracting the line. FIG. 9A, FIG. 9B, FIG. 10A and FIG. 10B illustrate a line extracting process performed by the line extracting unit 18. The edges of characters are extracted from the data of connected character areas of image data 3 illustrated in FIG. 9A in order to acquire character elements. Referring to FIG. 9B, rectangular circumscribing edges are acquired. Then, a distribution curve is generated by collecting only the widths of the circumscribing rectangles (character widths) for each line of the circumscribing rectangles as illustrated in FIG. 10A. When the sum of the widths of the circumscribing rectangles is larger than a predetermined threshold value, the corresponding line is determined to be a character line area. When the sum of the widths of the circumscribing rectangles is the predetermined threshold value or less, the corresponding line is determined to be a non-character line area (e.g., background area).

Referring to FIG. 10A, when there is an influence of noise caused by the line determined as the character line area, it is necessary to separate the lines into the character line area and the non-character line area. For each character area formed by one or more character areas, the width of the character areas between the right and left ends of the character line areas (hereinafter, referred to as a character line length) is obtained, and the value of the distribution curve is divided by the character line length for normalization.

Figure 10B:
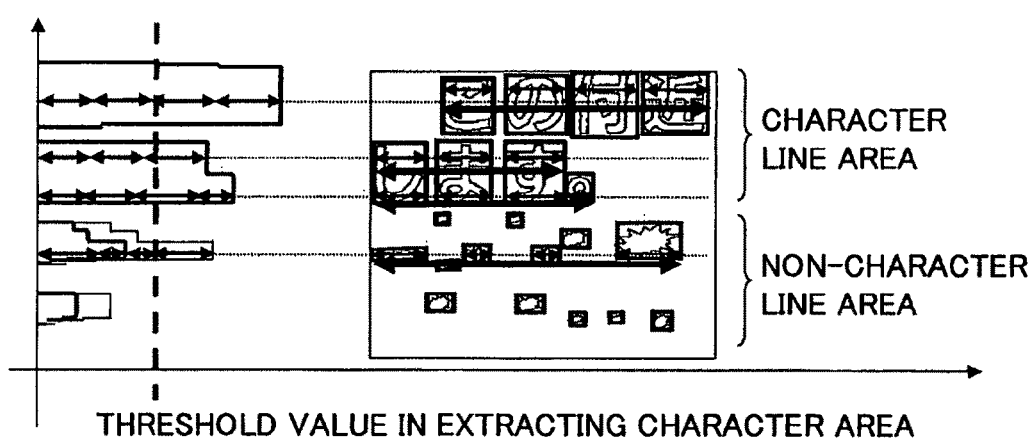

In the character line area, the value of the distribution curve, i.e., the sum of the widths of the circumscribing rectangles, and the character line length approximate each other. On the other hand, in the non-character line area, noise may be widely dispersed and the character line length tends to be longer than the sum of the widths of the rectangular circumscribing edges. Therefore, as illustrated in FIG. 10B, differences of the values of the distribution curves between the character line area and the non-character line area becomes large. Therefore, the noise determined as the character areas can be eliminated and positions of the character areas including the characters can be properly determined.

The character area extracting device 1 can perform a recursive process with a sequential process of steps S102 through S110, in which the first through third threshold values are revised based on the evaluation result of the separation process with a sequential process of steps S102 to S110. The binarizing process may be repeatedly performed using the revised threshold value, and the separation process is completed after the predetermined evaluation condition is satisfied.

The character area extracting device 1 may be formed so as to be assembled into a portable phone including a digital camera function or an image capturing function.

The character area extracting device 1 can be realized by a program representing a sequence of instructions, the instructions of the program when executed by the computer causing the computer to function as an image input unit, a reflective and non-reflective area separation unit, a reflective area binarizing unit, a non-reflective area binarizing unit, a reflective area binarizing evaluation unit, a non-reflective area binarizing evaluation unit, a reflective and non-reflective area separation evaluation unit, a line extracting unit, a character cutting-out and character recognition unit, a character recognition evaluation unit or the like. The program may be stored in recording media such as a non-transitory recording medium, a transitory recording medium, a portable memory, a semiconductor memory and a hard disk. The program may be executed after being recorded into the recording media or provided via communication interfaces by various communication networks.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that the various changes, substitutions, and alterations could be made hereto without departing from the spirit and scope of the invention.

What is claimed is:

1. A character area extracting device comprising:
   an image input unit configured to receive image data obtained by photographing a photographic subject;
   an image memory unit configured to store the received image data;
   a reflective and non-reflective area separation unit configured to binarize the image data with a first threshold value, separate the image data into a reflective area in which a pixel value is saturated and a non-reflective area in which the pixel value is not saturated, and binarize the image data by changing the first threshold value when it is determined that the first threshold value is evaluated not to be appropriate;
   a reflective area binarizing unit configured to binarize the reflective area of the image data with a second threshold value, separate the reflective area into a character area and a background area, and binarize the reflective area by changing the second threshold value when it is determined that the second threshold value is evaluated not to be appropriate;
   a non-reflective area binarizing unit configured to binarize the non-reflective area of the image data with a third threshold value, separate the non-reflective area into the character area and the background area, and binarize the non-reflective area by changing the third threshold value when it is determined that the third threshold value is evaluated not to be appropriate;
   a reflective and non-reflective area separation evaluation unit configured to evaluate the first, the second and the third threshold values using results of the separations with the reflective area binarizing unit and the non-reflective area binarizing unit; and
   a line extracting unit configured to connect the character area of the reflective area and the character area of the non-reflective area and extract positional information of the connected character area in the image data.

2. The character area extracting device according to claim 1,
   wherein the reflective and non-reflective area separation evaluation unit connects the character area of the non-reflective area to the character area of the reflective area, acquires a first outline pixel number of a first boundary between the connected character area and the reflective area and a second pixel number of a second boundary between the connected character area and the non-reflective area, determines whether a difference between the first and the second outline pixel numbers is in a first separation evaluating range, and evaluates that the first threshold value is not appropriate when the difference is not within the first separation evaluating range.

3. The character area extracting device according to claim 1,
   wherein the reflective and non-reflective area separation evaluation unit connects the character area of the non-reflective area to the character area of the reflective area, acquires a first outline pixel number of a first boundary between the connected character area and the reflective area and a second pixel number of a second boundary between the connected character area and the non-reflective area, determines whether a difference between the first and the second outline pixel numbers is in a second separation evaluating range, and evaluates that the second threshold value, the third threshold value, or the second and the third threshold values are not appropriate when the difference is not within the second separation evaluating range.

4. The character area extracting device according to claim 1, further comprising:
   a reflective area binarizing evaluation unit configured to acquire a third pixel number of a contact portion between an outline of the reflective area separated by the reflective and non-reflective area separation unit and an outline of the background area in the reflective area separated by the reflective area binarizing unit, determine whether the third pixel value is an evaluation value for the first threshold value or less, and evaluate that the first threshold value is not appropriate when the third pixel number exceeds the evaluation value for the first threshold value.

5. The character area extracting device according to claim 1, further comprising:
   a reflective area binarizing evaluation unit configured to acquire a fourth pixel number of the character area separated by the reflective area binarizing unit and a first character area outline pixel number of the character area, acquire a ratio of the fourth pixel number relative to the first character area outline pixel number, determine whether the acquired ratio is an evaluation value for the second threshold value or less, and evaluate that the second threshold value is not appropriate when the ratio exceeds the evaluation value for the second threshold value.

6. The character area extracting device according to claim 1, further comprising:
   a non-reflective area binarizing evaluation unit configured to acquire a fifth pixel number of the character area separated by the non-reflective area binarizing unit and a second character area outline pixel number of the character area, acquire a ratio of the fifth pixel number relative to the second character area outline pixel number, determine whether the acquired ratio is an evaluation value for the third threshold value or less, and evaluate that the third threshold value is not appropriate when the ratio exceeds the evaluation value for the third threshold value.

7. The character area extracting device according to claim 1,
wherein the reflective and non-reflective area separation unit has a plurality of density values as the first threshold value, separates by binarizing the image data using the plurality of density values, holds a plurality of results of the separations, and selects the result of the separation using the density value evaluated as being most appropriate when there is evaluation for the plurality of density values as the first threshold value.

8. The character area extracting device according to claim 1,
wherein the reflective area binarizing unit has a plurality of density values as the second threshold value, separates by binarizing the reflective area of the image data using the plurality of density values, holds a plurality of results of the separations, and selects the result of the separation using the density value evaluated as being most appropriate when there is evaluation for the plurality of density values as the second threshold value.

9. The character area extracting device according to claim 1,
wherein the non-reflective area binarizing unit has a plurality of density values as the third threshold value, separates by binarizing the non-reflective area of the image data using the plurality of density values, holds a plurality of results of the separations, and selects the result of the separation using the density value evaluated as being most appropriate when there is evaluation for the plurality of density values as the third threshold value.

10. The character area extracting device according to claim 1, further comprising:
a character cutting-out and character recognition unit configured to cut a character out of the character area of the image data based on positional information of a line in the connected character area extracted by the line extracting unit and recognize the cut character.

11. The character area extracting device according to claim 10, further comprising:
a character recognition evaluation unit configured to evaluate the character recognition by the character cutting-out and character recognition unit and evaluate at least one of the first threshold value, the second threshold value and the third threshold value.

12. An imaging device having a character area extracting device comprising:
an image input unit configured to receive image data obtained by photographing a photographic subject;
an image memory unit configured to store the received image data;
a reflective and non-reflective area separation unit configured to binarize the image data with a first threshold value, separate the image data into a reflective area in which a pixel value is saturated and a non-reflective area in which the pixel value is not saturated, and binarize the image data by changing the first threshold value when it is determined that the first threshold value is evaluated not to be appropriate;
a reflective area binarizing unit configured to binarize the reflective area of the image data with a second threshold value, separate the reflective area into a character area and a background area, and binarize the reflective area by changing the second threshold value when it is determined that the second threshold value is evaluated not to be appropriate;
a non-reflective area binarizing unit configured to binarize the non-reflective area of the image data with a third threshold value, separate the non-reflective area into the character area and the background area, and binarize the non-reflective area by changing the third threshold value when it is determined that the third threshold value is evaluated not to be appropriate;
a reflective and non-reflective area separation evaluation unit configured to evaluate the first, the second and the third threshold values using results of the separations with the reflective area binarizing unit and the non-reflective area binarizing unit; and
a line extracting unit configured to connect the character area of the reflective area and the character area of the non-reflective area and extract positional information of the connected character area in the image data.

13. A non-transitory recording medium storing a character area extracting program representing a sequence of instructions, the instructions of the character area extracting program which when executed by a computer causing the computer to function as:
an image input unit configured to receive image data obtained by photographing a photographic subject;
an image memory unit configured to store the received image data;
a reflective and non-reflective area separation unit configured to binarize the image data with a first threshold value, separate the image data into a reflective area in which a pixel value is saturated and a non-reflective area in which the pixel value is not saturated, and binarize the image data by changing the first threshold value when it is determined that the first threshold value is evaluated not to be appropriate;
a reflective area binarizing unit configured to binarize the reflective area of the image data with a second threshold value, separate the reflective area into a character area and a background area, and binarize the reflective area by changing the second threshold value when it is determined that the second threshold value is evaluated not to be appropriate;
a non-reflective area binarizing unit configured to binarize the non-reflective area of the image data with a third threshold value, separate the non-reflective area into the character area and the background area, and binarize the non-reflective area by changing the third threshold value when it is determined that the third threshold value is evaluated not to be appropriate;
a reflective and non-reflective area separation evaluation unit configured to evaluate the first, the second and the third threshold values using results of the separations with the reflective area binarizing unit and the non-reflective area binarizing unit; and
a line extracting unit configured to connect the character area of the reflective area and the character area of the non-reflective area and extract positional information of the connected character area in the image data.

14. The non-transitory recording medium according to claim 13,
wherein the reflective and non-reflective area separation evaluation unit connects the character area of the non-reflective area to the character area of the reflective area, acquires a first outline pixel number of a first boundary between the connected character area and the reflective area and a second pixel number of a second boundary between the connected character area and the non-reflective area, determines whether a difference between the first and the second outline pixel numbers is in a first separation evaluating range, and evaluates that the first threshold value is not appropriate when the difference is not within the first separation evaluating range.

15. The non-transitory recording medium according to claim 13,
wherein the reflective and non-reflective area separation evaluation unit connects the character area of the non-reflective area to the character area of the reflective area, acquires a first outline pixel number of a first boundary between the connected character area and the reflective area and a second pixel number of a second boundary between the connected character area and the non-reflective area, determines whether a difference between the first and the second outline pixel numbers is in a second separation evaluating range, and evaluates that the second threshold value, the third threshold value, or the second and the third threshold values are not appropriate when the difference is not within the second separation evaluating range.

16. The non-transitory recording medium according to claim 13, the instructions causing the computer to further function as:
a reflective area binarizing evaluation unit configured to acquire a third pixel number of a contact portion between an outline of the reflective area separated by the reflective and non-reflective area separation unit and an outline of the background area in the reflective area separated by the reflective area binarizing unit, determine whether the third pixel value is an evaluation value for the first threshold value or less, and evaluate that the first threshold value is not appropriate when the third pixel number exceeds the evaluation value for the first threshold value.

17. The non-transitory recording medium according to claim 13, the instructions causing the computer to further function as:
a reflective area binarizing evaluation unit configured to acquire a fourth pixel number of the character area separated by the reflective area binarizing unit and a first character area outline pixel number of the character area, acquire a ratio of the fourth pixel number relative to the first character area outline pixel number, determine whether the acquired ratio is an evaluation value for the second threshold value or less, and evaluate that the second threshold value is not appropriate when the ratio exceeds the evaluation value for the second threshold value.

18. The non-transitory recording medium according to claim 13, the instructions causing the computer to further function as:
a non-reflective area binarizing evaluation unit configured to acquire a fifth pixel number of the character area separated by the non-reflective area binarizing unit and a second character area outline pixel number of the character area, acquire a ratio of the fifth pixel number relative to the second character area outline pixel number, determine whether the acquired ratio is an evaluation value for the third threshold value or less, and evaluate that the third threshold value is not appropriate when the ratio exceeds the evaluation value for the third threshold value.

19. The non-transitory recording medium according to claim 13,
wherein the reflective and non-reflective area separation unit has a plurality of density values as the first threshold value, separates by binarizing the image data using the plurality of density values, holds a plurality of results of the separations, and selects the result of the separation using the density value evaluated as being most appropriate when there is evaluation for the plurality of density values as the first threshold value.

20. A character area extracting method comprising:
binarizing image data obtained by photographing a photographic subject with a first threshold value by separating the image data into a reflective area in which a pixel value is saturated and a non-reflective area in which the pixel value is not saturated and binarizing the image data by changing the first threshold value when it is determined that the first threshold value is evaluated not to be appropriate;
binarizing the reflective area of the image data with a second threshold value by separating the reflective area into a character area and a background area and by binarizing the reflective area by changing the second threshold value when it is determined that the second threshold value is evaluated not to be appropriate;
binarizing the non-reflective area of the image data with a third threshold value by separating the non-reflective area into the character area and the background area and binarizing the non-reflective area by changing the third threshold value when it is determined that the third threshold value is evaluated not to be appropriate;
evaluating the first, the second and the third threshold values using results of the separations;
connecting the character area of the reflective area and the character area of the non-reflective area; and
extracting positional information of the connected character area in the image data.

* * * * *